United States Patent
Brasz et al.

(10) Patent No.: US 7,100,380 B2
(45) Date of Patent: Sep. 5, 2006

(54) ORGANIC RANKINE CYCLE FLUID

(75) Inventors: Joost J. Brasz, Fayetteville, NY (US); Ulf J. Jonsson, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 350 days.

(21) Appl. No.: 10/771,012

(22) Filed: Feb. 3, 2004

(65) Prior Publication Data

US 2005/0166607 A1    Aug. 4, 2005

(51) Int. Cl.
- *F25B 1/00* (2006.01)
- *F25B 17/02* (2006.01)
- *F25B 15/00* (2006.01)

(52) U.S. Cl. .............. 62/114; 62/115; 62/118; 62/119

(58) Field of Classification Search .......... 62/112, 62/114; 252/67; 60/670
See application file for complete search history.

(56) References Cited

U.S. PATENT DOCUMENTS

| | | | |
|---|---|---|---|
| 4,386,499 A | 6/1983 | Raviv et al. | |
| 4,590,384 A | 5/1986 | Bronicki | |
| 4,617,808 A | 10/1986 | Edwards | |
| 4,760,705 A | 8/1988 | Yogev et al. | |
| 4,806,662 A * | 2/1989 | Bargigia et al. | 549/511 |
| 4,901,531 A | 2/1990 | Kubo et al. | |
| 5,038,567 A | 8/1991 | Mortiz | |
| 5,119,635 A | 6/1992 | Harel | |
| 5,339,632 A | 8/1994 | McCrabb et al. | |
| 5,598,706 A | 2/1997 | Bronicki et al. | |
| 5,632,143 A | 5/1997 | Fisher et al. | |
| 5,640,842 A | 6/1997 | Bronicki | |
| 5,664,419 A | 9/1997 | Kaplan | |
| 5,761,921 A | 6/1998 | Hori et al. | |
| 5,809,782 A | 9/1998 | Bronicki et al. | |
| 5,860,279 A | 1/1999 | Bronicki et al. | |
| 6,009,711 A | 1/2000 | Kreiger et al. | |
| 6,101,813 A | 8/2000 | Sami et al. | |
| 6,478,979 B1 * | 11/2002 | Rivers et al. | 252/2 |
| 6,497,090 B1 | 12/2002 | Bronicki et al. | |
| 6,539,718 B1 | 4/2003 | Bronicki et al. | |
| 6,539,720 B1 | 4/2003 | Rouse et al. | |
| 6,539,723 B1 | 4/2003 | Bronicki et al. | |
| 6,571,548 B1 | 6/2003 | Bronicki et al. | |
| 2002/0148225 A1 | 10/2002 | Lewis | |
| 2003/0029169 A1 | 2/2003 | Hanna et al. | |

(Continued)

FOREIGN PATENT DOCUMENTS

DE    19630559    1/1998

(Continued)

OTHER PUBLICATIONS

3M Novec 1230 Fire Protection Fluid. Product Information [online]. 3M, 2003 [retrieved on Dec. 14, 2004]. Retrieved from the Internet: <URL: www.3m.com/novec1230fluid>.*

*Primary Examiner*—Denise L. Esquivel
*Assistant Examiner*—Richard L. Leung
(74) *Attorney, Agent, or Firm*—Wall Marjama & Bilinski LLP

(57) ABSTRACT

A method of operating an organic rankine cycle system wherein a liquid refrigerant is circulated to an evaporator where heat is introduced to the refrigerant to convert it to vapor. The vapor is then passed through a turbine, with the resulting cooled vapor then passing through a condenser for condensing the vapor to a liquid. The refrigerant is one of $CF_3CF_2C(O)CF(CF_3)_2$, $(CF_3)_2CFC(O)CF(CF_3)_2$, $CF_3(CF_2)_2C(O)CF(CF_3)_2$, $CF_3(CF_2)_3C(O)CF(CG_3)_2$, $CF_3(CF_2)_5C(O)CF_3$, $CF_3CF_2C(O)CF_2CF_2CF_3$, $CF_3C(O)CF(CF_3)_2$.

10 Claims, 5 Drawing Sheets

U.S. PATENT DOCUMENTS

| | | |
|---|---|---|
| 2003/0089110 A1 | 5/2003 | Niikura et al. |
| 2003/0167769 A1 | 9/2003 | Bharathan et al. |
| 2004/0088985 A1* | 5/2004 | Brasz et al. .................. 60/670 |
| 2004/0217322 A1* | 11/2004 | Sharma et al. ................. 252/2 |

FOREIGN PATENT DOCUMENTS

| | | |
|---|---|---|
| DE | 19907512 | 8/2000 |
| DE | 10029732 | 1/2002 |
| EP | 1243758 | 9/2002 |
| JP | 52046244 | 4/1977 |
| JP | 54045419 | 4/1979 |
| JP | 54060634 | 5/1979 |
| JP | 55091711 | 7/1980 |
| JP | 55131096 | * 10/1980 |
| JP | 5808409 | 5/1983 |
| JP | 58122308 | 7/1983 |
| JP | 59043928 | 3/1984 |
| JP | 59054712 | 3/1984 |
| JP | 59063310 | 4/1984 |
| JP | 59138707 | 8/1984 |
| JP | 59158303 | 9/1984 |
| JP | 60158561 | 8/1988 |
| JP | 06088523 | 3/1994 |
| JP | 2002266655 | 9/2002 |
| JP | 2002285805 | 10/2002 |
| JP | 2002285907 | 10/2002 |
| JP | 2003161101 | 6/2003 |
| JP | 2003161114 | 6/2003 |
| WO | 98/06791 | 2/1998 |
| WO | 02/099279 | 12/2002 |
| WO | 03/078800 | 9/2003 |

* cited by examiner

ORGANIC RANKINE CYCLE FLUID

FEDERALLY SPONSORED RESEARCH

The U.S. Government has a paid-up license in this invention and the right in limited circumstances to require the patent owner to license others on reasonable terms as provided for by the terms of DE-FC02-00CH11060 awarded by the Department of Energy.

BACKGROUND OF THE INVENTION

This invention relates generally to organic rankine cycle systems and, more particularly, to the use of an improved working fluid in such systems.

The well known closed rankine cycle comprises a boiler or evaporator for the evaporation of a motive fluid, a turbine fed with vapor from the boiler to drive the generator or other load, a condenser for condensing the exhaust vapors from the turbine and a means, such as a pump, for recycling the condensed fluid to the boiler. Such a system as is shown and described in U.S. Pat. No. 3,393,515.

Such rankine cycle systems are commonly used for the purpose of generating electrical power that is provided to a power distribution system, or grid, for residential and commercial use across the country. The motive fluid used in such systems is often water, with the turbine then being driven by steam. The source of heat to the boiler can be of any form of fossil fuel, e.g. oil, coal, natural gas or nuclear power. The turbines in such systems are designed to operate at relatively high pressures and high temperatures and are relatively expensive in their manufacture and use.

The Organic Rankine Cycle (ORC) is a vapor power cycle with refrigerant (an organic fluid) instead of water/steam as the working fluid. Functionally it resembles the steam cycle power plant: a pump increases the pressure of condensed liquid refrigerant. This liquid is vaporized in an evaporator/boiler by extracting waste heat from turbine or engine exhaust. The high-pressure refrigerant vapor expands in a turbine, producing power. The low-pressure vapor leaving the turbine is condensed before being sent back to the pump to restart the cycle.

For refrigerants with certain properties, commercially available air-conditioning and refrigeration equipment with its proven reliability and performance record can be used cost effectively in a power producing ORC system.

The rankine cycle used for power generation production goes through the following four processes in this order:
1. Adiabatic pressure rise through a pump
2. Isobaric heat addition in a preheater, evaporator and superheater
3. Adiabatic expansion in a turbine
4. Isobaric heat rejection in a condenser.

The main thermodynamic irreversibility in organic rankine cycles is caused by the large temperature difference in the evaporator between the temperature of the waste heat stream and the boiling refrigerant. The higher the waste heat stream temperature is the larger this irreversibility becomes. Organic fluids that can boil at higher temperatures have the ability to reduce the temperature difference between the waste heat stream and the organic rankine cycle working fluid and will therefore result in higher thermodynamic ORC cycle efficiency. Fluids can boil at temperatures up to the critical temperature, above which there is no boiling. Consequently, fluids with higher critical temperatures will result in higher ORC cycle efficiency. Chlorine containing fluids with high critical temperatures have been proposed in the past as ORC fluids. For example, R114, R113, R11, R141b and R123 have higher critical temperatures than R245fa and would result in substantially higher thermal efficiencies. However, these fluids are either flammable and/or toxic, ozone layer depleting and/or have substantial global warming impact. They have either been banned (the CFC's) or soon will be banned (the HCFC's) and therefore will not be available for use in future ORC products.

SUMMARY OF THE INVENTION

It is therefore an object of the present invention to overcome the problems of the prior art described above.

It is a further object of the present invention to provide a new and improved organic rankine cycle working fluid.

Another object of the present invention is the provision of an organic rankine cycle working fluid that can operate at lower pressures and lower turbo machinery speed.

Yet another object of the present invention is the provision of an organic cycle working fluid having a high critical temperature that is also environmentally friendly.

Still another object fo the present invention is the provision for a rankine cycle system which is economical, practical in use, and which is environmentally friendly.

It has been discovered that an organic fluid recently introduced into the market place as a fire extinguishing fluid has unique applications as a working fluid or refrigerant in an organic rankine cycle system. One example of a preferred fluid is the ketone $CF_3CF_2C(O)CF(CF_3)_2$ which has a critical temperature higher than that of the most acceptable prior art fluid R245fa. This fluid has zero ozone layer potential and zero global warming potential, and is therefore environmentally friendly.

This fluid and equivalent ketones can be advantageously used in a typical organic rankine cycle system such as where a pump is used to circulate liquid refrigerant to an evaporator where heat is introduced to the refrigerant to convert it to vapor, with the vapor then passing first through a plurality of nozzles and then through a turbine. The resulting cooled vapor is then passing through a condenser for condensing the vapor to a liquid. In the present invention the refrigerant can be any of $CF_3CF_2C(O)CF(CF_3)_2$, $(CF_3)_2CFC(O)CF(CF_3)_2$, $CF_3(CF_2)_2C(O)CF(CF_3)_2$, $CF_3(CF_2)_3C(O)CF(CG_3)_2$, $CF_3(CF_2)_5C(O)CF_3$, $CF_3CF_2C(O)CF_2CF_2CF_3$, $CF_3C(O)CF(CF_3)_2$, perfluorocyclohexanone, and mixtures thereof.

BRIEF DESCRIPTION OF THE DRAWING

For a further understanding of these and objects of the invention, reference will be made to the following detailed description of the invention which is to be read in connection with the accompanying drawing, wherein.

DETAILED DESCRIPTION OF THE INVENTION

Figure 1:
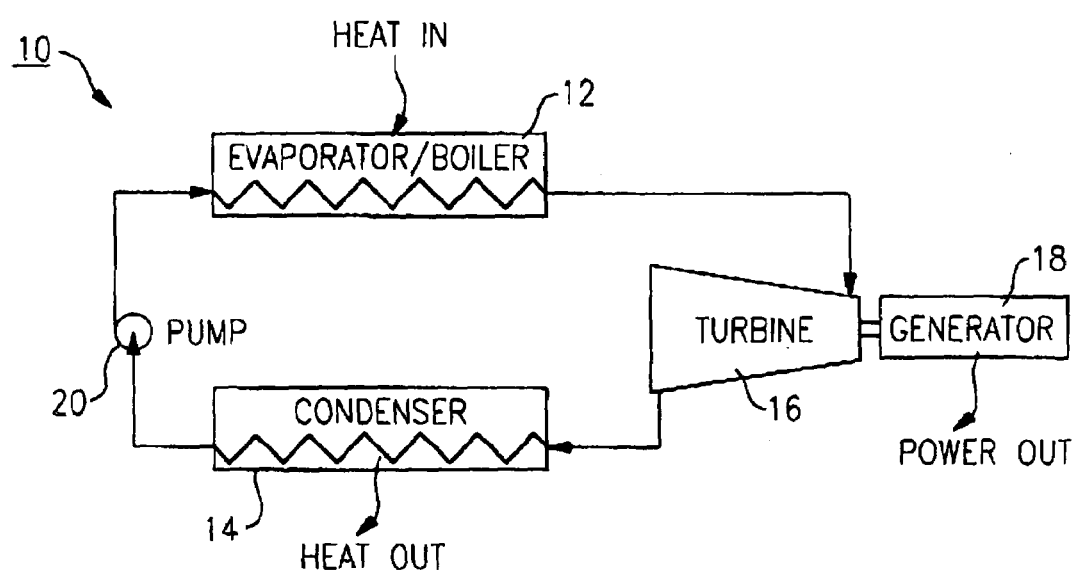
FIG. 1 is a schematic illustration of an organic rankine cycle system in accordance with the present invention.

Referring to FIG. 1, a typical rankine cycle system 10 as shown includes an evaporator/boiler 12 and a condenser 14 which, respectively, receives and dispenses heat. These components perform similar functions in the vapor compression cycle used in conventional air conditioning and refrigeration systems. These heat exchanger components can therefore be used with minor modifications in organic rankine cycle applications. The rankine cycle contains a power producing turbine 16 which is driven by the motive fluid in the system and in turn drives a generator 18 that produces power as well as power consuming pump 20 that increases the pressure of the liquid leaving the condenser.

In operation, the evaporator which is commonly a boiler having a significant heat input, vaporizes the motive fluid, which is the novel refrigerant of the present invention, with the vapor then passing to the turbine for providing motive power thereto. Upon leaving the turbine, the low pressure vapor passes to the condenser 14 where it is condensed by way of heat exchange relationship with a cooling medium. The condensed liquid is then circulated to the evaporator by a pump 20 as shown to complete the cycle.

Figure 2:
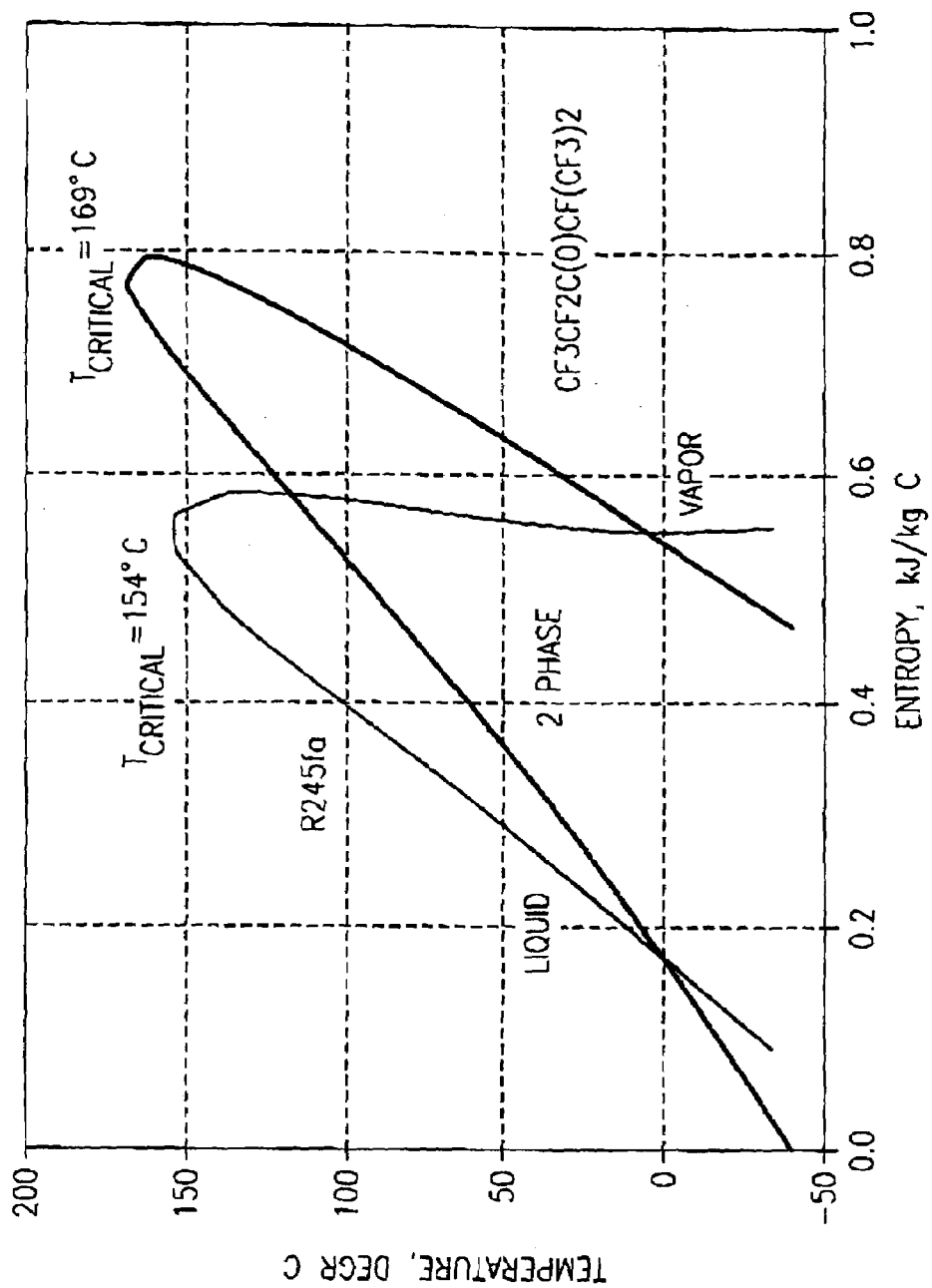
FIG. 2 are comparative TS diagrams for R245fa and $CF_3CF_2C(O)CF(CF_3)_2$.

FIG. 2 shows a comparative TS diagram for R245fa and $CF_3CF_2C(O)CF(CF_3)_2$. Note the higher critical temperature for $CF_3CF_2C(O)CF(CF_3)_2$.

Figure 3:
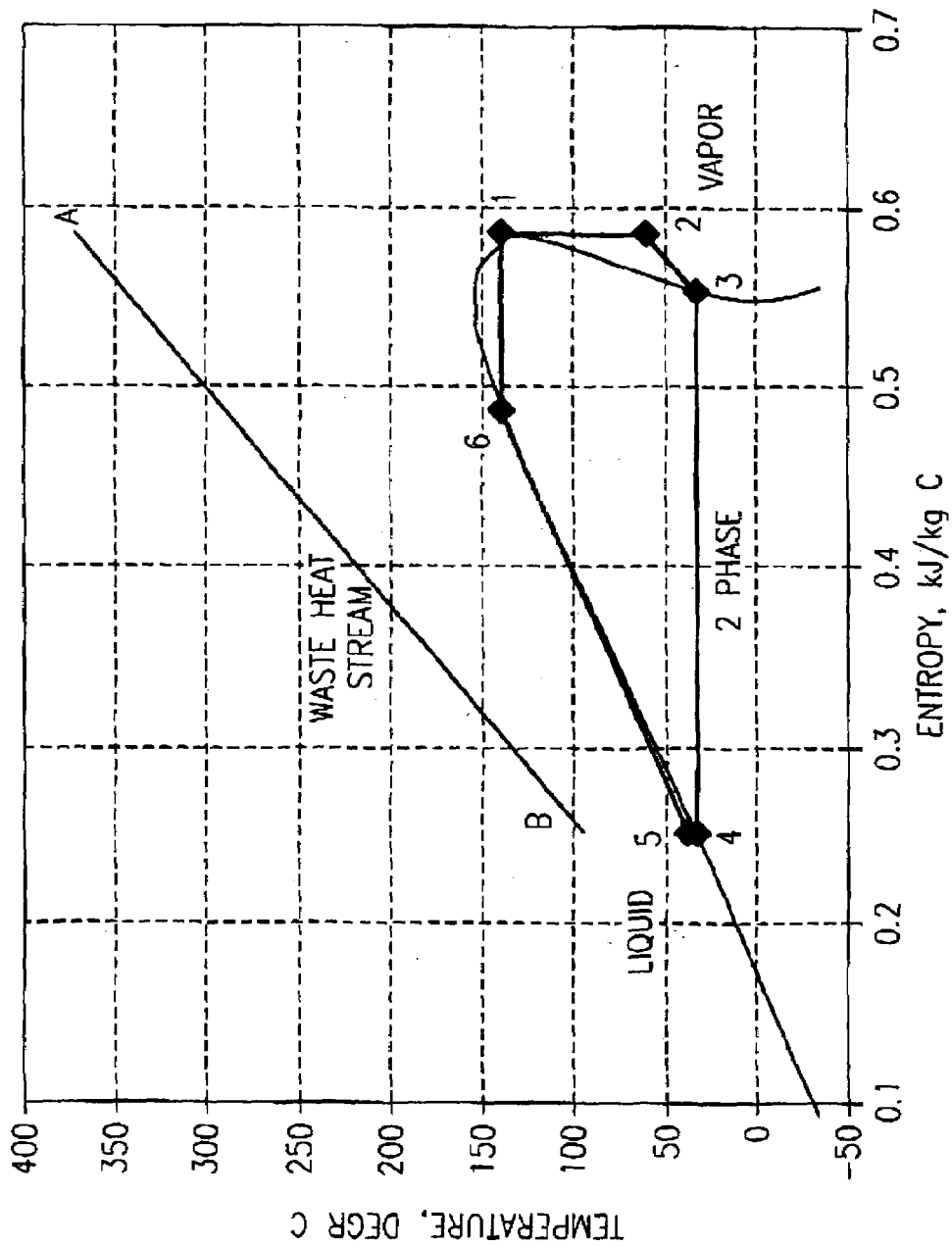
FIG. 3 illustrates an ORC with 245fa utilizing a 370° C. sensible waste heat source.

FIG. 3 shows the Organic Rankine Cycle with R245fa utilizing a 370° C. sensible waste heat source (point A) being cooled down to 93° C. (point B). The processes in the R245fa organic Rankine cycle include expansion of the working fluid in a turbine and thus producing power going from state point 1 to 2. Desuperheating (2->3) and condensing (3->4) in the condenser, thus rejecting to ambient. Increasing the pressure with a pump (4->5) and preheating (5->6) and evaporating (6->1) in the refrigerating boiler utilizing the waste heat that is being cooled down from an inlet temperature A to an exit temperature B.

Figure 4:
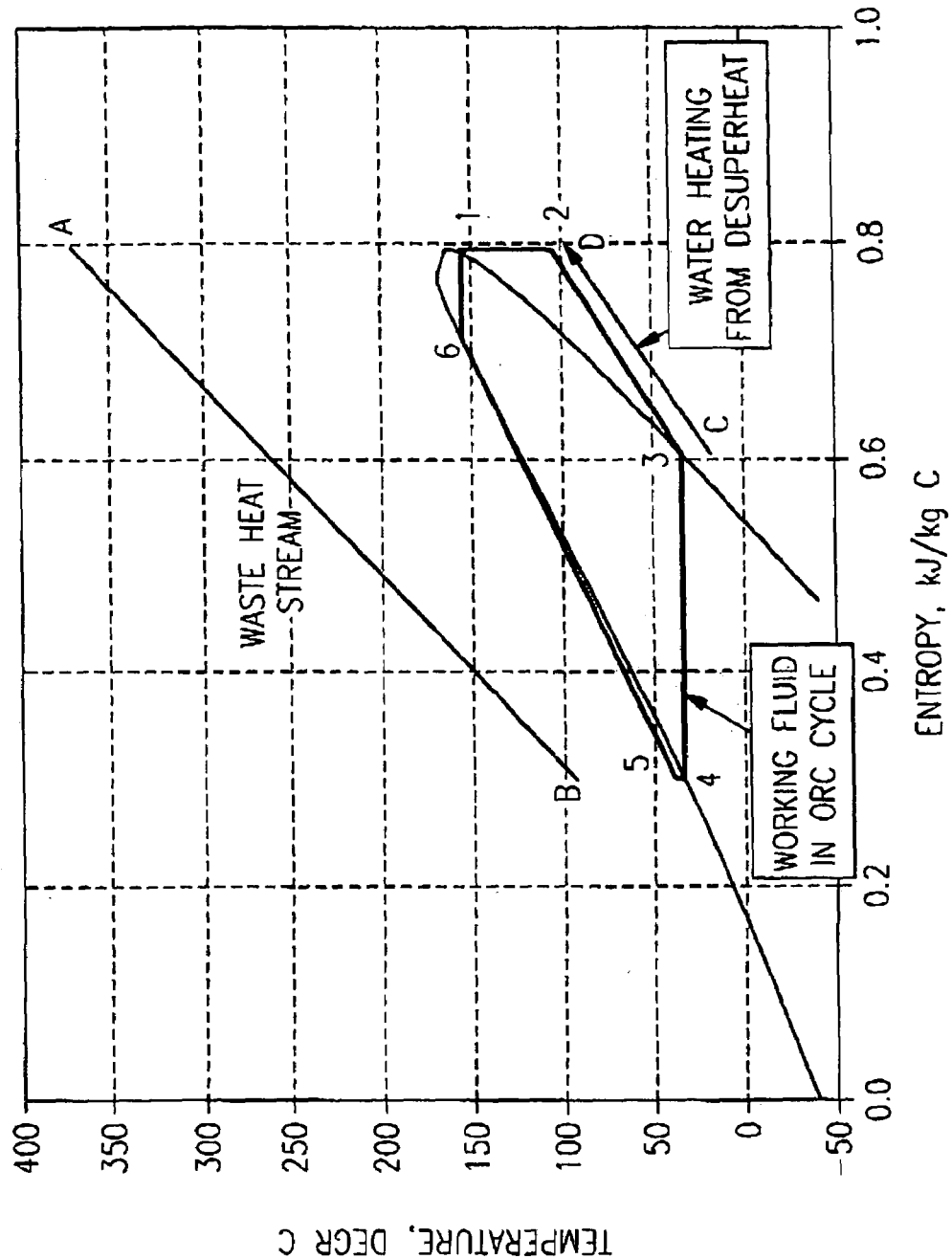
FIG. 4 illustrates an ORC with $CF_3CF_2C(O)CF(CF_3)_2$ utilizing a 370° C. sensible waste heat source.

FIG. 4 shows an organic Rankine cycle with $CF_3CF_2C(O)CF(CF_3)_2$ utilizing the same waste heat stream. Due to the fact that the critical temperature of $CF_3CF_2C(O)CF(CF_3)_2$ is higher than that of R245fa as shown in FIG. 1, the heat transfer irreversibility—the area AB561A–is slightly larger for R245fa than for $CF_3CF_2C(O)CF(CF_3)_2$. This results in a larger thermodynamic Rankine cycle efficiency for $CF_3CF_2C(O)CF(CF_3)_2$ compared to R245fa.

Figure 5:
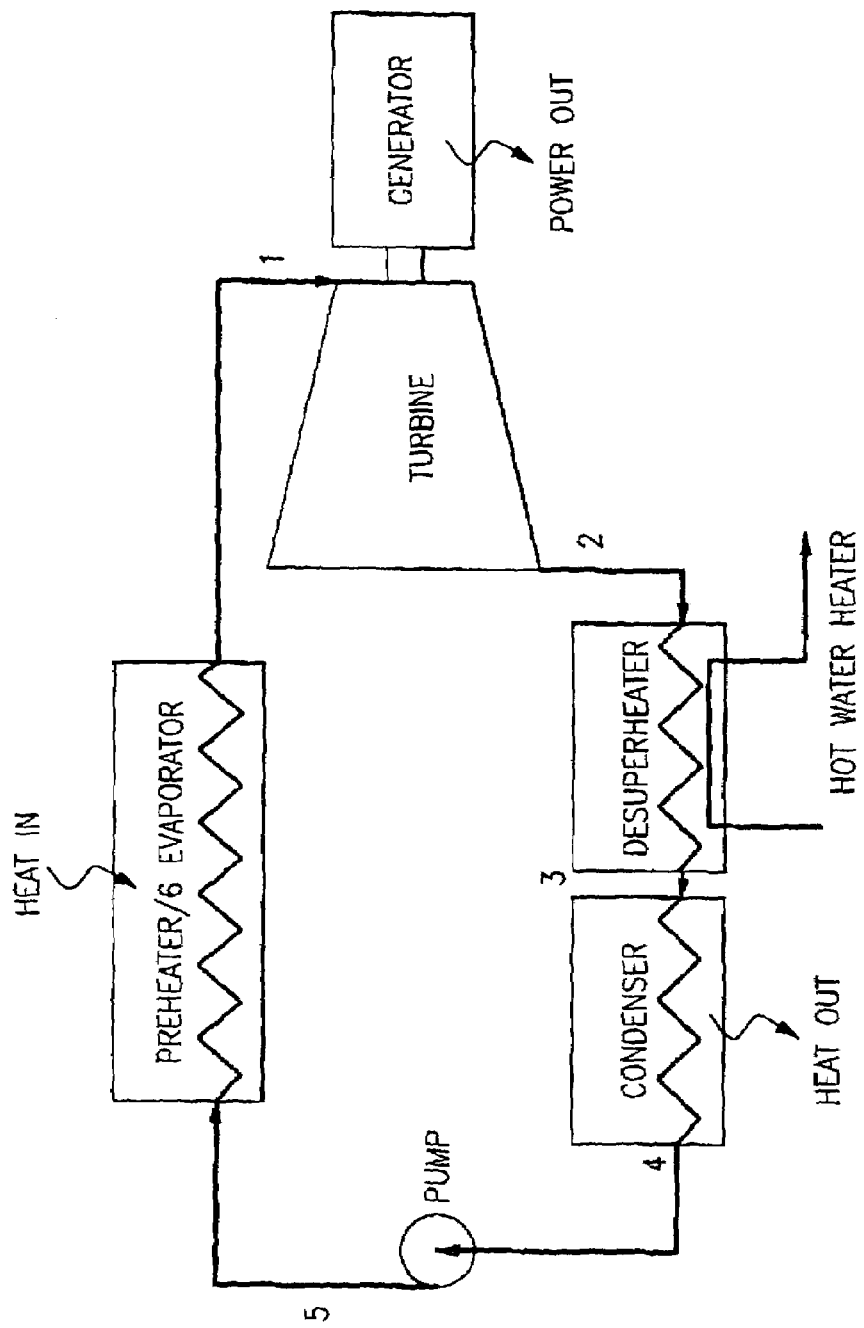
FIG. 5 is a schematic illustration of an organic rankine cycle system illustrating a second embodiment of the present invention.

The turbine exit temperature at state point 2 is higher for $CF_3CF_2C(O)CF(CF_3)_2$ than for R245fa. This allows the replacement of part of the condenser with a water heater and running the Organic Rankine cycle in a CHP (combined heat and power) mode as shown in FIG. 5 In order to achieve the same CHP function with R245fa, higher turbine inlet temperatures would be required complicating the design and resulting in higher first cost.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A method of operating an organic rankine cycle system wherein a liquid refrigerant is circulated to an evaporator where heat is introduced to the refrigerant to convert it to vapor, with the vapor then passing through a turbine, with the resulting cooled vapor then passing through a condenser for condensing the vapor to a liquid; wherein said refrigerant is selected from the group consisting of $CF_3CF_2C(O)CF(CF_3)_2$, $(CF_3)_2CFC(O)CF(CF_3)_2$, $CF_3(CF_2)_2C(O)CF(CF_3)_2$, $CF_3(CF_2)_3C(O)CF(CG_3)_2$, $CF_3(CF_2)_5C(O)CF_3$, $CF_3CF_2C(O)CF_2CF_2CF_3$, $CF_3C(O)CF(CF_3)_2$.

2. A method of operating an organic rankine cycle system wherein a liquid refrigerant is circulated to an evaporator where heat extracted from an internal combustion engine is introduced to the refrigerant to convert it to vapor, with the vapor then passing through a turbine, with the resulting cooled vapor then passing through a condenser for condensing the vapor to a liquid; wherein said refrigerant is selected from the group consisting of $CF_3CF_2C(O)CF(CF_3)_2$, $(CF_3)_2CFC(O)CF(CF_3)_2$, $CF_3(CF_2)_2C(O)CF(CF_3)_2$, $CF_3(CF_2)_3C(O)CF(CG_3)_2$, $CF_3(CF_2)_5C(O)CF_3$, $CF_3CF_2C(O)CF_2CF_2CF_3$, $CF_3C(O)CF(CF_3)_2$.

3. A method as set forth in claim 2 wherein the step of extracting heat from said internal combustion engine is accomplished by extracting heat from exhaust gases leaving said internal combustion engine.

4. A method as set forth in claim 2 wherein the step of extracting heat from the internal combustion engine is accomplished by extracting heat from coolant flowing within the said combustion engine.

5. A method of operating an organic rankine cycle system wherein a pump is used to circulate liquid refrigerant to an evaporator where heat is introduced to the refrigerant to convert it to vapor, with the vapor then passing first through a plurality of nozzles and then through a turbine, with the resulting cooled vapor ten passing through a condenser for condensing the vapor to a liquid; wherein the step of introducing heat to the refrigerant is by way of extracting waste heat from an engine and further wherein said refrigerant is at least one selected from the group consisting of $CF_3CF_2C(O)CF(CF_3)_2$, $(CF_3)_2CFC(O)CF(CF_3)_2$, $CF_3(CF_2)_2C(O)CF(CF_3)_2$, $CF_3(CF_2)_3C(O)CF(CG_3)_2$, $CF_3(CF_2)_5C(O)CF_3$, $CF_3CF_2C(O)CF_2CF_2CF_3$, $CF_3C(O)CF(CF_3)_2$, perfluorocyclohexanone, and mixtures thereof.

6. A method as set forth in claim 5 wherein said engine is an internal combustion engine.

7. A method of operating an organic rankine cycle system wherein a liquid refrigerant is circulated to an evaporator where heat is introduced to the refrigerant to convert it to vapor, with the vapor then passing through a turbine, with the resulting cooled vapor then passing through a condenser for condensing the vapor to a liquid; wherein said refrigerant is $CF_3CF_2C(O)CF(CF_3)_2$.

8. A method of operating an organic rankine cycle system wherein a liquid refrigerant is circulated to an evaporator where heat is introduced to the refrigerant to convert it to vapor, with the vapor then passing through a turbine, with the resulting cooled vapor then passing through a condenser for condensing the vapor to a liquid; wherein said refrigerant is $CF_3CF_2C(O)CF(CF_3)_2$, and where said condenser further includes a water heater which utilizes waste heat from said turbine to generate hot water.

9. A method of operating an organic rankine cycle system wherein a liquid refrigerant is circulated to an evaporator where heat extracted from an internal combustion engine is introduced to the refrigerant to convert it to vapor, with the vapor then passing through a turbine, with the resulting cooled vapor then passing through a condenser for condensing the vapor to a liquid; wherein said refrigerant is $CF_3CF_2C(O)CF(CF_3)_2$.

10. A method of operating an organic rankine cycle system wherein a pump is used to circulate liquid refrigerant to an evaporator where heat is introduced to the refrigerant to convert it to vapor, with the vapor then passing first through a plurality of nozzles and then through a turbine, with the resulting cooled vapor then passing through a condenser for condensing the vapor to a liquid; wherein the step of introducing heat to the refrigerant is by way of extracting waste heat from an engine and further wherein said refrigerant is $CF_3CF_2C(O)CF(CF_3)_2$.

* * * * *